Patented Dec. 24, 1940

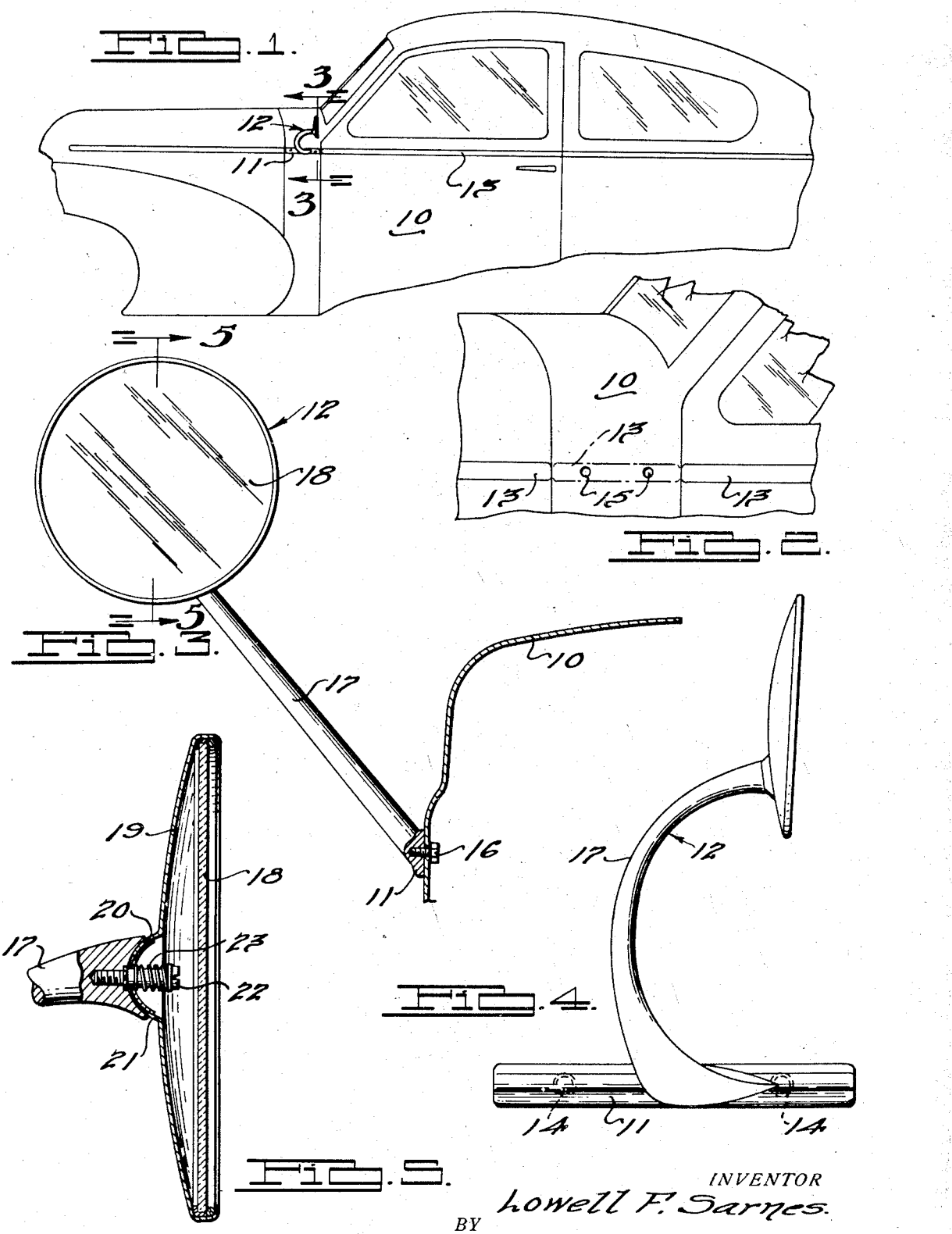

2,226,482

UNITED STATES PATENT OFFICE 2,226,482

MIRROR ASSEMBLY

Lowell F. Sarnes, Detroit, Mich., assignor to Monarch Governor Company, Detroit, Mich., a corporation of Michigan Application January 16, 1939, Serial No. 251,072

3 Claims. (Cl. 88—93)

The present invention relates to an improved mirror assembly and particularly although not exclusively to an improved rear view mirror assembly for a motor vehicle.

In accordance with conventional construction of certain motor vehicle bodies a belt line molding or beading is provided about portions of the exterior of the body chiefly for decorative purposes. This molding or beading is usually in sections extending in abutting relation along the body so as to give the effect or appearance of a continuous molding. I have found that the height and position of this molding are such as to permit a rear view mirror to be mounted advantageously at the locality of one section of the molding, especially at a point in advance of the front door of an automobile. Thus, in the instance of a rear view mirror to be mounted on the side of the body in advance of the front door a section of the belt line molding, or the equivalent in appearance, may be used as a support for the mirror. This avoids the necessity of attaching the mirror to the upper outside hinge of the door as has been customary, and in the case of cars having concealed front door hinges provides an immediately available mounting means which is not available where the door hinges are concealed.

It is a principal object of the present invention to provide a structure in which a mirror assembly and a member adapted to form a section of a belt line molding are combined; and one which is adapted to be mounted directly upon the exterior of a vehicle body and which is after mounting, adapted to form a harmonious part of the said belt line molding.

It is another object of the invention to provide a device of the foregoing character which is adapted to replace or take the place of a portion or portions of a belt line molding and to be held in place by the same or similar fastening means utilized to retain the said portions in place, so that no additional apertures or other alterations in the vehicle body need be made in order to install the said device.

It is a further object of the invention to provide a mirror assembly of the above character which may be easily installed, one which is compact in structure, attractive in appearance and adapted for use on a conventional vehicle body.

Other objects and advantages of this invention will appear in the following description and appended claims, reference being had to the accompanying drawing forming a part of this specification wherein like reference characters designate corresponding parts in the several views.

Fig. 1 is a fragmentary side elevation of a vehicle body showing one form of the present invention applied thereto.

Fig. 2 is a detailed view of a portion of the body shown in Fig. 1, indicating the position and manner in which the present assembly is mounted.

Fig. 3 is a cross section of the form of the invention shown in Fig. 1, taken along the lines 3—3 of Fig. 1 in the direction of the arrows.

Fig. 4 is a side elevation of the mirror assembly shown in Fig. 1.

Fig. 5 is a detail view in cross section of the reflector portion of the mirror assembly shown in Fig. 4, indicating, in particular, one way in which that reflector may be secured to the mirror shank.

Before explaining in detail the present invention it is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

Referring to the drawing, one form of mirror assembly embodying the present invention is there shown as applied to the exterior surface of a vehicle body 10. The present form of the invention is shown as a whole in Fig. 1 and, generally speaking, comprises an elongated base in the form of a metallic attaching plate or strip 11 to which a mirror unit designated in general by the reference numeral 12 is fixed, as best shown in Fig. 4. On being applied to the vehicle body, the present mirror assembly is particularly adapted to take the place of a removable section of a belt line molding 13, especially that section normally fixed to the cowl portion of the vehicle body, and is adapted to utilize the same or similar fastening means used to retain that section in place.

Referring in detail to the attaching plate 11, it is preferably metallic in structure and is conformed in shape and made to appear substantially like the particular belt line molding 13 with which its use is contemplated. It follows that the plate 11 may have any one of many designs and finishes dependent upon its intended use. In length the plate 11 is made suitable to replace a given removable section of the belt line molding 13, especially that section normally applied to the cowl portion of the vehicle body. Consequently, the said length may also vary dependent upon the particular use to which my mirror assembly is put.

In its underside the plate 11 is provided with a pair of blindly terminating openings 14—14 (Fig. 4), each of which is preferably positioned to register with one of a pair of apertures 15—15 in the vehicle body 10. Each opening 14 is formed to receive one of the screws or fastening elements 16—16 normally used to retain the aforesaid removable section of the belt line molding in place. However, if fastening elements other than screws are used to retain the said molding upon the vehicle body, the openings 14—14 may be altered suitably to receive the same or may be eliminated should they be unnecessary. In this connection it is to be understood that fastening elements other than those employed to retain the molding in place may be utilized for my mirror assembly, if desired. In the latter event it might be unnecessary to align the openings 14—14 with the apertures 15—15. Suitable alterations in the plate 11 adapting it to the fastening means mentioned are considered evident to a mechanic. However, the aforesaid method of aligning the openings 14—14 with those numbered 15—15, so that the same or equivalent fastening elements used to retain the belt line molding may also be used for the present mirror assembly, constitutes a preferred structure.

Referring to the mirror member 12, this member is firmly fixed to the outer surface of the strip 11 either integrally or by other suitable means. The mirror member 12 may be of any general type, construction and design; but preferably consists of a conventional rear view mirror used upon a motor vehicle body. Such a structure normally includes a metallic shank 17, the base of which in the present instance is fixed to the strip 11. In addition, such a structure includes a silvered glass 18 or an equivalent reflector, which member is encased within and retained by a metallic backing 19. The backing 19 possesses an inwardly turned flange for gripping the reflector 18, which reflector, however, is preferably separately insertable within the said backing. The backing 19 is fixed to the upper end of the shank 17 by pivotal means so that the position of the reflecting surface is rendered adjustable.

A preferred means for pivotally mounting the reflector 18 to the shank 17 is shown in Fig. 5. As there shown, the upper end portion or head of the shank 17 is provided with a generally concave cup-like indenture or recess 20. The recess 20 is adapted to receive a convex boss or socket portion 21 of the reflector backing 19, which socket portion is shaped and dimensioned to conform to the surfaces of the recess 20. The socket portion 21 is inserted in the recess 20 and is held in place by suitable means, such as a screw 22 threaded into an appropriate opening within the shank 17. If desired, resilient means such as the spring 23 may be interposed between the outer surface of the socket 21 and the head of the screw 22. It will be seen from the foregoing that limited universal movement is permitted between the reflector unit and the shank 17 and that the former may be manually adjusted in a desired position relative to the latter.

It is to be understood, however, that the structure of the mirror unit 12 described above is, as such, but illustrative of one application of the present invention and that any operative mirror unit may be employed.

My mirror assembly is preferably applied to the outer surface of the vehicle body 10 in the following manner: A section of the belt line molding 13, such as that indicated by the dotted lines in Fig. 2, is removed by taking out the screws or fastening elements 16—16 used to retain that section. The elongated base member 10 or molding strip 11 carrying the mirror unit 12 then replaces the said molding section. Each of the apertures 15—15 in the vehicle body 10 register with one of the openings 14—14 in the plate 11; for as explained previously the latter are placed to so register. The fastening elements 16—16 are reinserted in the apertures 15—15, are threaded into the openings 16—16 which are adapted to receive them, and are tightened up thus securing my assembly to the vehicle body. It will be noted that the described structure requires no new openings in the vehicle body 10 or no different fastening elements from those required to secure the belt line molding in place. It follows that my assembly may be very conveniently and readily applied by a simple manual operation.

It is pointed out, however, that fastening elements other than those employed to retain the belt line molding may be utilized to secure my assembly to the vehicle body. In the latter event, the openings 14—14 would not have to be aligned with openings in the vehicle body. Moreover, the base of my assembly may be made in production as a part of the belt line molding rather than being applied in place of a removable section thereof. In the latter event, the assembly is mounted on the vehicle body together with the belt line molding and is secured to the body as a part of the latter, the base strip 11 forming a continuous section of the molding. Naturally in this instance the means used to secure the molding in place is also used to retain the mirror assembly. It will be readily appreciated that under such circumstances my assembly may be made removable or not, depending upon the means used to apply it to the vehicle body.

From the foregoing it will be seen that I have provided a rear view mirror assembly or a mounting therefor including an elongated base shaped, dimensioned and designed substantially like the belt line molding and constructed to take the place of a section of the molding in advance of the door and form a continuation of the molding. The section 11 simulates the remainder of the molding and is shown as a relatively narrow strip having parallel side edges and having a width and exterior shape substantially like the molding 13. The mirror supporting arm 17 projects outwardly from the base and is firmly attached thereto either integrally, as shown by way of example, or in any other suitable manner.

I claim:

1. A mounting for a rear view mirror on an automobile having a belt line molding along the side of the body and in advance of the front door, said mounting comprising an elongated base shaped, dimensioned and designed substantially like said belt line molding and constructed to take the place of a section of the molding in advance of the door and form a continuation of the molding, a mirror supporting arm extending outwardly from said base, a mirror carried by said arm at the outer end thereof, and a plurality of threaded fastening elements adapted to extend into the base and through apertures in the body for securing the base to the body and concealed thereby when the mirror mounting is secured to the body.

2. A rear view mirror assembly for an automobile body having a belt line molding along the side of the body, comprising an elongated relatively narrow base having parallel side edges and of a length to take the place of a section of the moldng in advance of the front docr, said base having a width and exterior shape substantially like said molding, means for attaching said base to the automobile body from the inside theroef, a mirror supporting arm projecting frcm said base, and a mirror carried by the arm.

3. In an automobile body having a belt line molding along the side of the body, one section of said molding in advance of the frcnt door being replaced and the replaced section comprising a base with parallel side edges and simulating in dimensions, shape and design the remainder of the molding, a plurality of fastening elements for securing the base to the body from the inside of the latter, a mirror supporting arm merging into the base, and a mirror carried by said arm.

LOWELL F. SARNES.